United States Patent Office 3,519,436
Patented July 7, 1970

3,519,436
METHOD FOR MAKING PLASTIC LOW FAT EMULSION SPREAD
Clifford D. Bauer, Gerald L. Neuser, and Hamilton A. Pinkalla, Milwaukee, Wis., assignors to W. R. Grace & Co., New York, N.Y., a corporation of Connecticut
No Drawing. Continuation of application Ser. No. 532,560, Mar. 8, 1966. This application May 9, 1969, Ser. No. 824,392
Int. Cl. A23d 3/02
U.S. Cl. 99—123         4 Claims

ABSTRACT OF THE DISCLOSURE

The invention disclosed is directed to a plastic low-fat containing food spread for use as a butter substitute. The food spread is formed of a dispersion of a water-in-oil emulsion that contains considerable amounts of water and various proportions of emulsifiers, edible fats, and flavoring ingredients.

---

This application is a continuation of copending application Ser. No. 532,560 filed Mar. 8, 1966 and now abandoned.

The present invention relates to plastic water-fat food compositions, and more specifically to low fat content solid water and fat dispersions which possess the flavor, texture and appearance of butter and conventional butter substitutes, i.e. margarines.

The prior art discloses numerous margarine compositions which closely resemble butter in flavor consistency and appearance. These margarine products generally comprise a major amount of fat (usually in excess of 80%), water and/or milk derivatives and various flavoring ingredients. In order for these products to simulate butter it is generally necessary to use large proportions of saturated fats. Furthermore, it has been found necessary to use a large proportion of fat to water in order to produce a margarine-type product which has the flavor, texture, and appearance of butter.

To date satisfactory butter substitutes which contain a large proportion of water have not been produced. The need for such a product is evidenced by the fact that from a dietary standpoint it is frequently found that the high saturated fat content and caloric value of butter and conventional margarines is undesirable.

It is therefore an overall object to provide a low caloric spread which rivals the flavor, texture, appearance and utility of butter and conventional butter substitutes.

It is another object of the present invention to provide a method for easily preparing margarine type compositions which possess the flavor, consistency and appearance of butter and high fat content margarines.

It is a further object to provide a margarine type composition which may contain a minimum amount of saturated fats and a maximum amount of water.

These and still further objects of the present invention will become readily apparent to one skilled in the art from the following description and detailed specific examples.

Broadly, our invention contemplates a butter substitute which comprises a plastic water and fat dispersion that contains considerable amounts of water and various proportions of emulsifiers and flavoring ingredients hereinafter defined. In the more preferred compositions of the present invention, the water ingredient will comprise from about 40 to 65% by weight of the total composition.

More specifically, we have found that an exceptionally stable and acceptable butter substitute may be prepared by the following steps:

(1) Forming a water in oil emulsion comprising the following components, wherein the parts are by weight (a) from about 50–74 parts water, (b) from about 26–50 parts fat, (c) from about 0.1 to 22 parts of an edible emulsifier composition which comprises (1) from 0.6 to 10 parts wax, (2) 1 to 12 parts lipophilic and hydrophilic non-ionic emulsifiers which yield a hydrophilic and lipophilic balance from about 3 to 6 as defined by Becher ACS Monograph 135, 1956, the ratio of hydrophilic to the lipophilic emulsifier ranging from about 0 to 75% by weight hydrophilic emulsifier, and from about 100 to 25% by weight of the lipophilic emulsifier, said lipophilic emulsifier having an iodine value greater than 8; and (d) flavoring and stabilizing ingredients as desired and required, and (2) Cooling said emulison under conditions of constant agitation to a temperature below the solidification point thereof to obtain a homogenous solid water in oil dispersion.

The water in oil emulsions used to prepare the compositions of the present invention are generally disclosed in U.S. Pat. 3,223,532 dated Dec. 14, 1965, to Pinkalla et al. wherein the water contents are held within the limits set forth above.

The fats used in preparing the present compositions may comprise edible fats of either animal or vegetable origin. Typically, these fats include oils derived from plant sources such as corn, cotton seed, safflower, soybeans and so forth. Furthermore, animal fat derivatives which are derived from the processing of poultry, pork and beef animals may also be used. In certain instances, it is also contemplated that modified (hydrogenated) derivatives of these naturally occurring fats may be used. In one preferred practice of the present invention, wherein it is desired to maintain the level of saturated fats at a minimum, the fat content of the present composition comprises unsaturated fats of vegetable origin.

It is found that these normally liquid fats may be readily incorporated in the present solid dispersions using the technique disclosed herein to produce a stable non-weeping product.

The emulsifier compositions used in preparing the present products contain at least two and sometimes three ingredients. These are edible waxes, lipophilic emulsifiers and optionally, hydrophilic emulsifiers.

The waxes used in preparing the emulsifier composition may be either of vegetable or animal origin. Typical edible waxes include beeswax, carnauba and candelilla.

The emulsifiers which may be used in the practice of the present invention are generally defined as edible non-ionic hydrophilic and lipophilic emulsifiers having a total hydrophilic lipophilic balance (HLB) of from about 3 to 6. Typical examples of hydrophilic emulsifiers which may be used are described in Table I below.

preservatives such as benzoic acid (or salts thereof) and sorbic acid.

To prepare the present solid dispersions, a water in

TABLE I

| Chemical name | HLB | °F. or °C. | Iodine value | Average percent purity | Trade name |
|---|---|---|---|---|---|
| Lecithin (O/W type) | | Soft plastic | 90–95 | 60.0 | Centrophil S.M. |
| Polyethylene glycol 400 distearate | 7.8 | 33–38 C | <5 | 90.0 | S1009. |
| Polyethylene glycol 400 mono-oleate | 11.0 | <2 C | 31–40 | 100.0 | S1802. |
| Acetylated tartrated monoglyceride of veg. oil. | 12.0 | Liq. at room temp | 45–55 | 8.5 | Drewmulse A.T.M.G. |
| Do | 12.0 | 130 F | 5 | 20.0 | TEM 4H. |
| Polyoxyethylene (20) sorbitan monostearate. | 14.9 | Liq. at room temp | 1.5 | 100.0 | Glycosperse S20. |
| Do | 14.9 | do | 1.5 | 100.0 | Tween 60. |
| Acetylated tartrated glyceryl monostearate. | 15.0 | 131 F | [1]3 | 30.0 | Drewmulse ATMS Spec. |
| Do | 15.0 | 136 F | [1]3 | 40.0 | Gloss-Add. |
| Do | 15.0 | Soft past room temp | 60 | 20.0 | TEM 4C. |
| Polyoxyethylene (20) sorbitan monooleate. | 15.0 | Liq. at room temp | 19–22 | 100.0 | Glycosperse 020. |

[1] Max.

(Tested with lipophilic emulsifer, Myverol 18-71E)

Typical examples of primary lipophilic emulsifiers are given in Table II below.

oil emulsion is first prepared from the fat, water and emulsifier components. To prepare this emulsion, it is

TABLE II

| Chemical name | HLB | °F. or °C. (M.P.) | Iodine value | Average percent purity | Trade name |
|---|---|---|---|---|---|
| Lecithin (W/O type) | | Liq. at room temp | 90–95 | 4.0 | Centrophil IP. |
| Glyceryl mono-oleate | 3.4 | 65 F | 70–80 | 42.5 | S1096. |
| Glyceryl mono-oleate from veg. fat | 3.5 | 118 F | 65–75 | 42.5 | GMV soft. |
| Glyceryl mono-oleate from cottonseed oil | 3.5 | 110 G | 80–90 | 42.5 | GMC soft. |
| Glyceryl mono-oleate from coconut oil | 3.5 | 90 F | 6–10 (ave.) | 52.5 | GM-CNO. |
| Glyceryl mono-oleate from peanut oil | 3.5 | 49 C | 80–90 | 42.5 | GM-PNO. |
| Glyceryl mono-oleate | 3.5 | Liq. at 68 F | 80–95 | 42.5 | GMO. |
| Do | 3.5 | Liq. at room temp | 74–78 | 56.5 | Atmos 300. |
| Do | 3.5 | 98 F | 65–70 | [1]90 | Myverol 18-71E. |
| Do | 3.8 | 102–108 F | 110–120 | 18 | Myverol 18-98. |
| Glycerol monolinoleate | | | | 74 | |
| Glycerol monosterate | 3.8 | 115–122 F | 54–64 | 42.0 | Atmul 80. |
| Do | 3.8 | 125–127 F | 54–61 | 67.0 | Atmul 122. |
| Glyceryl mono-oleate | 5.2 | 20 C | 65–75 | 38.0 | S1097. |

[1] Min.

(Tested with hydrophilic emulsifier, Drewmusle ATMS Spec.)

In addition to the lipophilic emulsifiers listed in Table II above, it also contemplated that secondary lipophilic emulsifiers, generally described in the prior art as lipophilic "thinners," may be utilized in conjunction with the primary emulsifiers. Numerous examples of the lipophilic thinners are set forth in Table III below.

generally preferred to first prepare a blend of the liquified fat or oil and emulsifier constituents. This blend is ordinarily brought to a liquid condition by heating to a temperature on the order of 160° F. Subsequent to preparing a homogenous blend of a liquified fat in oil and emulsifier, any fat soluble flavorings, stabilizing, or color-

TABLE III

| Chemical name | HLB | °F. or °C. (M.P.) | Iodine value | Average percent purity | Trade name |
|---|---|---|---|---|---|
| Glyceryl mono-oleate | 3.5 | 135–142 F | <2 | 54.0 | Atmos 150. |
| Glyceryl mono-stearate | 3.6 | 134.6–141.8 F | <5 | 42.5 | Aldo 53. |
| Do | 3.8 | 138–142 C | [1]<8 | 42.0 | Atmul 84K. |
| Do | 3.8 | 140 F | [1]3 | 42.5 | GMS-V hard-SE. |
| Glyceryl lactopalmitate | 4.0 | 140 F | [1]2 | 12.0 | GLP-12. |
| Glyceryl lactostearate | 4.0 | 140 F | [1]2 | 12.0 | GLS-12. |
| Do | 4.0 | 140 F | [1]<5 | 12.0 | SL 101. |
| Sorbitan mono-stearate | 4.7 | 122 F | 2½ | 100.0 | Glycomul S. |
| Do | 4.7 | 122 F | 5 | 100.0 | Span 60. |
| Glyceryl mono-stearate | 5.8 | 132.8–141.8 F | <5 | 39.0 | Aldo 28. |
| Propyleneglycol stearate | 5.4 | 43–46 C | <7 | 100.0 | Pegosperse PS. |

[1] Max.

(Tested with hydrophilic emulsifier, Drewmulse ATMS Spec. and lipophilic emulsifier, Myverol 18-71E)

Reference to Table II illustrates primary lipophilic emulsifiers which may be used. These primary emulsifiers have an iodine value of greater than about 8 which is required in the formation of the present emulsions. The lipophilic emulsifiers of Table III which have an iodine value of less than about 8 may be used as secondary ingredients to replace up to about 30% by weight of the primary lipophilic emulsifier "or thinners."

In addition to the above mentioned water fat and emulsifier constituents, the present compositions preferably contain suitable flavoring ingredients. To prepare a butter substitute it is frequently desirable to include flavoring ingredients such as 1 to 3% salt (sodium chloride), 1 to 4 p.p.m. diacetyl, and 1 to 6% skimmed milk solids. In addition, the present compositions may contain coloring ingredients such as B-carotene and food ing ingredients may be added at this point. The liquified blend of fat constituents is then cooled to temperatures generally on the range of from about 100 to 125° F. and the water component including any water soluble flavoring or stabilizing ingredient is added under agitation to form a uniform mixture. Generally, during the addition of the water components, the rate of addition is regulated so that all the water is emulsified as it is added. This procedure aids in obtaining a uniform dispersion of water droplets throughout the continuous oil phase. Subsequent to forming a uniform liquid emulsion of the above defined components, the emulsion is then chilled under conditions of constant agitation to a point below the solidification point thereof. Generally, conversion to the plastic state of the products contemplated herein takes place at a temperature on the range of from about 70° to about 40° F. The agitation during cooling may be carried out in a conventional blending apparatus, however, it should be sufficiently vigorous to maintain the uniform water in oil dispersion formed during the emulsification forming operation. When the final product is cooled to below its solidification point, it closely resembles the appearance and texture of butter or conventional margarine products. The product does not weep upon storage for extended periods at temperatures ranging from about 70 to about 40° F. Furthermore, it is found that the dispersion retains a dry surface during storage.

The present product, due to the fact that it contains substantially less fat than conventional butter or margarine type products has a caloric value much lower than these products. When flavored in the manner well known to those skilled in the art, the present product compares very favorably with conventional type compositions. The present dispersions may be readily processed into shapes and packages commonly used in the packaging of butter and conventional butter substituents.

Having described the essential aspects of the present invention the following examples are given to illustrate specific embodiments thereof.

EXAMPLE I

A low calorie spread has the following composition (percentage by weight):

| | |
|---|---|
| Margarine fat mixture | 35.5 |
| Beeswax | 2.0 |
| Glyceryl monooleate | 1.9 |
| Water | 58.0 |
| Salt (sodium chloride) | 2.6 |

With flavor and color as required.

The beeswax and the gylceryl monooleate are pre-dissolved in the fat followed by the addition of the water and salt with vigorous mixing at 135° F.

The dispersion of the aqueous phase in the fat is pumped through a scraped surface heat exchanger-homogenizer with cooling of the mass to about 65° F. effecting fat crystallization. The soft plastic mass sets to a firm consistency in about one hour with cooling.

The resulting product is easily spreadable at refrigerator temperatures, and retains a dry surface upon storage and does not weep.

EXAMPLE II

A low calorie spread has the following composition (percentage by weight):

| | |
|---|---|
| Hydrogeneated soybean oil | 28.4 |
| Cottonseed oil | 7.1 |
| Beeswax | 1.4 |
| Glyceryl monooleate | 1.4 |
| Cultured skimmed milk (about 8–9% solids) | 59.6 |
| Salt (sodium chloride) | 2.0 |
| Sodium benzoate | .1 |

Flavor and color as required.

The beeswax and glyceryl monooleate are completely pre-dissolved and mixed in the soybean and cottonseed oils and the mixture heated to about 140° F.

The salt and sodium benzoate are dissolved in the cultured skimmed milk and added to the fat phase with stirring with a Lightnin mixer. This liquid mixture is metered into a scraped surface cooler homogenizer. The cooled product leaves the homogenizer as a smooth soft plastic mass that sets to a typical margarine like consistency in about one hour with cooling.

EXAMPLE III

A low calorie spread has the following composition (percentage by weight):

| | |
|---|---|
| Corn oil | 17.5 |
| Hydrogenated corn oil | 18.0 |
| Beeswax | 2.0 |
| Glyceryl monooleate | 1.9 |
| Water | 58.0 |
| Sodium chloride | 2.6 |

Flavor and color as required.

The corn oil and hydrogenerated corn oil, beeswax and myverol are completely liquified and mixed at about 160° F. followed by cooling to 115° F. and slowly added to the fat phase while mixing at intermediate speed in a planetary mixer fitted with a whip. The mixing is continued until the mass acquires a soft plastic texture. The cooled product is smooth and sets to the consistency of margarine in about one hour.

The above examples clearly illustrate that stable useful butter substitutes may be prepared by following the steps of the present invention.

We claim:
1. A method for preparing a plastic low-fat containing food spread which consists essentially of:
   (A) forming a liquid homogeneous blend by heating:
      (1) from about 26 to 50 parts fat formed of unsaturated edible vegetable oils combined with hydrogenated oils; and
      (2) from about 0.1 to 22 parts of an edible emulsifier formed of non-ionic hydrophilic and lipophilic emulsifiers, about 1 to 12 parts of said emulsifier having an HLB value of from about 3 to 6, said hydrophilic emulsifier being present in amounts varying from about 0 to 75% by weight and said lipophilic emulsifier being present in amounts from about 100 to 25% by weight, the lipophilic emulsifier having an iodine value of greater than 8, with from about 0.6 to 10 parts by weight of edible wax;
   (B) cooling the homogenous blend (A) to a temperature in the range of from about 100 to 125° F.;
   (C) adding with agitation about 50 to 74 parts water to form a uniform mixture of a water-in-oil emulsion; and
   (D) cooling said emulsion (C) under conditions of constant agitation to below the solidification point thereof to obtain a stable water-in-oil solid dispersion.

2. The method of claim 1 wherein said emulsifier is glyceryl monooleate.

3. A method for preparing a plastic low-fat containing food spread which consists essentially of:
   (A) forming a liquid homogeneous blend by heating:
      (1) from about 26 to 50 parts fat formed of unsaturated edible vegetable oils combined with hydrogenated oils; and
      (2) from about 0.1 to 22 parts of an edible emulsifier formed of non-ionic hydrophilic and lipophilic emulsifiers, about 1 to 12 parts of said emulsifier having an HLB value of from about 3 to 6, said hydrophilic emulsifier being present in amounts varying from about 0 to 75% by weight and said lipophilic emulsifier being present in amounts from about 100 to 25% by weight, the lipophilic emulsifier having an iodine value of greater than 8, with from about 0.6 to 10 parts by weight of edible wax;
   (B) adding a flavoring ingredient selected from the group consisting of:
      (1) 1 to 6% skimmed milk solids,
      (2) 1 to 4 p.p.m. diacetyl, and
      (3) 1 to 3% sodium chloride,
      said flavoring ingredient being added in an amount based on the total weight of prepared food spread and subsequent to preparing a liquid homogenous blend;
   (C) cooling the homogenous blend (B) to a temperature in the range of from about 100 to 125° F.;
   (D) adding with agitation about 50 to 74 parts water to form a uniform mixture of a water-in-oil emulsion; and (E) cooling said emulsion (D) under conditions of constant agitation to below the solidification point thereof to obtain a stable water-in-oil solid dispersion.

4. The method of claim 1 wherein said cooling step (D) is to a temperature of about 70 to about 40° F. to obtain a solid dispersion having a plastic consistency.

References Cited

UNITED STATES PATENTS

| | | | |
|---|---|---|---|
| 2,150,649 | 3/1939 | Ellis | 99—123 |
| 3,223,532 | 12/1965 | Pinkalla et al. | 99—123 |
| 3,360,378 | 12/1967 | Spitzer et al. | 99—123 |

MAURICE W. GREENSTEIN, Primary Examiner